(12) United States Patent
Wang et al.

(10) Patent No.: US 10,045,003 B2
(45) Date of Patent: Aug. 7, 2018

(54) EFFICIENT MODE DECISION METHOD FOR MULTIVIEW VIDEO CODING BASED ON MOTION VECTORS

(71) Applicant: ATI Technologies ULC, Markham (CA)

(72) Inventors: Jiao Wang, Richmond Hill (CA); Mohamed K. Cherif, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 107 days.

(21) Appl. No.: 15/099,247

(22) Filed: Apr. 14, 2016

(65) Prior Publication Data

US 2016/0227189 A1 Aug. 4, 2016

Related U.S. Application Data

(62) Division of application No. 13/470,555, filed on May 14, 2012, now Pat. No. 9,344,727.

(51) Int. Cl.
*H04N 13/00* (2018.01)
*H04N 19/103* (2014.01)
*H04N 19/597* (2014.01)
*H04N 19/139* (2014.01)
*H04N 19/176* (2014.01)
*H04N 19/147* (2014.01)

(52) U.S. Cl.
CPC ....... *H04N 13/0048* (2013.01); *H04N 19/103* (2014.11); *H04N 19/139* (2014.11); *H04N 19/147* (2014.11); *H04N 19/176* (2014.11); *H04N 19/597* (2014.11)

(58) Field of Classification Search
None
See application file for complete search history.

(56) References Cited

U.S. PATENT DOCUMENTS

| 6,148,026 | A | * | 11/2000 | Puri | ............... | H04N 19/29 |
| | | | | | | 375/240 |
| 7,499,491 | B2 | * | 3/2009 | Lee | ............... | H04N 19/56 |
| | | | | | | 375/240.12 |
| 2008/0204592 | A1 | | 8/2008 | Jia et al. | | |

(Continued)

OTHER PUBLICATIONS

Shen et al., "Fast Mode Decision for Multiview Video Coding," 978-1-4244-5654-3/09, IEEE ICIP 2009.*

(Continued)

*Primary Examiner* — Edemio Navas, Jr.
(74) *Attorney, Agent, or Firm* — Volpe and Koenig, P.C.

(57) ABSTRACT

A method for determining a macroblock (MB) coding mode for a current MB in a dependent view. A window around a co-located MB in a base view is determined, wherein the co-located MB is a MB in the base view having a same location as the current MB in the dependent view. A coding mode complexity value (CMCV) is determined for each MB in the window, wherein the CMCV is based on a coding mode used to encode the MB. Rate distortion optimization (RDO) is performed for the current MB using a reduced number of coding modes if a total CMCV for all MBs in the window is less than a threshold, or using all supported coding modes if the total CMCV for all MBs in the window is greater than the threshold. A coding mode for the current MB is determined based on the RDO results.

8 Claims, 5 Drawing Sheets

(56) References Cited

U.S. PATENT DOCUMENTS

2010/0226436 A1    9/2010   Dane et al.
2011/0090371 A1    4/2011   Cote et al.
2011/0310976 A1   12/2011   Wang et al.

OTHER PUBLICATIONS

Kim et al., "Fast Mode Decision Algorithm for Inter-Layer Coding in Scalable Video Coding", Aug. 2009, IEEE Transactions on Consumer Electronics, vol. 55, No. 3, pp. 1572-7580.

Kim, "Novel Inter-Mode Decision Algorithm Based on Macrobook (MB) Tracking for the P-Slice in H.264/AVC Video Coding", IEEE Transactions On Circuits and Systems for Video Technology, vol. 18, No. 2, Feb. 2008.

Li et al., Fast Fast Mode Decision Algorithm for Inter-Frame Coding in Fully Scalable Video Coding:, IEEE Transactions on Circuits and Systems for Video Technology, vol. 16, No. 7, Jul. 2006.

Shen et al., "Fast Mode Decision for Multiview Video Coding", 978-1-4244-5654-3109, IEEE ICIP 2009.

Liu et al., "View-Adaptive Motion Estimation and Disparity Estimation for Low Complexity Multiview Video Coding", IEEE Transactions on Circuits and Systems for Video Technology, vol. 20, No. 6, Jun. 2010.

Jo et al., Efficient 16×16 Block Size Mode Detection in H.264, 17th European Signal Processing Conference (EUSIPCO 2009), Glasgow, Scotland, Aug. 24-28, 2009, EURASIP. 2009, pp. 2226-2230.

\* cited by examiner

200

| | | |
|---|---|---|
| $MB_0$ | $MB_1$ | $MB_2$ |
| $MB_3$ | $MB_{CUR}$ | $MB_4$ |
| $MB_5$ | $MB_6$ | $MB_7$ |

FIG. 3

EFFICIENT MODE DECISION METHOD FOR MULTIVIEW VIDEO CODING BASED ON MOTION VECTORS

CROSS REFERENCE TO RELATED APPLICATION

This application is a divisional of U.S. patent application Ser. No. 13/470,555, filed May 14, 2012, which is incorporated by reference as if fully set forth.

FIELD OF THE INVENTION

The present invention is generally directed to multiview video coding, and in particular, to selecting a macroblock coding mode for use in multiview video coding.

BACKGROUND

With the growing demand for improved display technologies, new applications for three dimensional (3D) scene communication have emerged. Multiview video coding (MVC) has been used to reduce data bandwidth associated with 3D video. Recently it has been standardized jointly by the ITU-T Video Coding Experts Group (VCEG) and the ISO/IEC Moving Pictures Experts Group (MPEG) as an extension of the H.264/AVC specification, under "Annex H Multiview video coding."

The most common use case for the 3D display system is the classic stereo system which requires two views, a base view and a dependent view. The base view makes use of temporal prediction from pictures on the same base view layer. The dependent view uses both temporal prediction from pictures of the same dependent view layer, but it uses also inter-view prediction from the base view layer. This logic can be extended further with multiple layers for the other advanced multiview systems that are capable of displaying more than stereoscopic views. In this case, each dependent view has access to image predictors on its same layer and also similar predictors from the layer(s) below it.

There are multiple macroblock (MB) coding modes supported in MVC, such as the inter modes (skip, inter16×16, inter16×8, inter8×16, inter8×8, inter8×4, inter4×8, and inter4×4), and the intra modes (intra16×16, intra8×8, and intra4×4). The popular implementations of MVC encoders use a rate distortion optimization (RDO) technique to find an efficient coding mode (among other encoder parameters). That means for each MB, an exhaustive motion-compensated prediction MVC encoder loops over all of the supported MB coding modes to calculate the rate distortion (RD) cost, and then selects the MB coding mode that has the minimum RD cost as the preferred prediction mode for the selected MB. This exhaustive process is very time consuming, and accelerating the lengthy MVC encoding process would be beneficial. Such an acceleration would benefit, for example, systems with limited processing power, or could help in handling multiple encoding jobs while performing the MVC encoding, such as performing multiple stream encoding.

SUMMARY OF EMBODIMENTS

An efficient coding mode decision algorithm is described, to reduce the overall MVC encoding computational complexity, while retaining a high fidelity to the original exhaustive search mechanism, so as not to sacrifice quality for speed. Two algorithms are described: one based on the coding mode complexity for a current MB, the other based on motion vectors.

A method for determining a macroblock (MB) coding mode for a current MB in a dependent view is disclosed. A window around a co-located MB in a base view is determined, wherein the co-located MB is a MB in the base view having a same location as the current MB in the dependent view. A coding mode complexity value is determined for each MB in the window, wherein the coding mode complexity value is based on a coding mode used to encode the MB. Rate distortion optimization (RDO) is performed for the current MB using a reduced number of coding modes if a total coding mode complexity value for all MBs in the window is less than a threshold, or using all supported coding modes if the total coding mode complexity value for all MBs in the window is greater than or equal to the threshold. A coding mode for the current MB is determined based on the RDO results.

An apparatus configured to determine a macroblock (MB) coding mode for a current MB in a dependent view includes a mode decision block. The mode decision block is configured to: determine a window around a co-located MB in a base view, wherein the co-located MB is a MB in the base view having a same location as the current MB in the dependent view; determine a coding mode complexity value for each MB in the window, wherein the coding mode complexity value is based on a coding mode used to encode the MB; perform rate distortion optimization (RDO) for the current MB using a reduced number of coding modes if a total coding mode complexity value for all MBs in the window is less than a threshold; perform RDO for the current MB using all supported coding modes if the total coding mode complexity value for all MBs in the window is greater than or equal to the threshold; and determine a coding mode for the current MB based on the RDO results.

A non-transitory computer-readable storage medium storing a set of instructions for execution by a general purpose computer to determine a macroblock (MB) coding mode for a current MB in a dependent view, the set of instructions including a first determining code segment, a second determining code segment, a first performing code segment, a second performing code segment, and a third determining code segment. The first determining code segment determines a window around a co-located MB in a base view, wherein the co-located MB is a MB in the base view having a same location as the current MB in the dependent view. The second determining code segment determines a coding mode complexity value for each MB in the window, wherein the coding mode complexity value is based on a coding mode used to encode the MB. The first performing code segment performs rate distortion optimization (RDO) for the current MB using a reduced number of coding modes if a total coding mode complexity value for all MBs in the window is less than a threshold. The second performing code segment performs RDO for the current MB using all supported coding modes if the total coding mode complexity value for all MBs in the window is greater than or equal to the threshold. The third determining code segment determines a coding mode for the current MB based on the RDO results.

A method for determining a macroblock (MB) coding mode for a current MB in a dependent view includes determining a window around a co-located MB in a base view, wherein the co-located MB is a MB in the base view having a same location as the current MB in the dependent view; selecting a motion vector (MV) of a MB in the window that is close to the co-located MB as a candidate MV; calculating an average MV of all candidate MVs in the window; performing rate distortion optimization (RDO) for the current MB using a reduced number of coding modes if a difference between the MV of the co-located MB and the average MB is greater than or equal to a threshold; performing RDO for the current MB using all supported coding modes if the difference between the MV of the co-located MB and the average MB is less than the threshold; and determining a coding mode for the current MB based on the RDO results.

An apparatus configured to determine a macroblock (MB) coding mode for a current MB in a dependent view includes a mode decision block. The mode decision block is configured to: determine a window around a co-located MB in a base view, wherein the co-located MB is a MB in the base view having a same location as the current MB in the dependent view; select a motion vector (MV) of a MB in the window that is close to the co-located MB as a candidate MV; calculate an average MV of all candidate MVs in the window; perform rate distortion optimization (RDO) for the current MB using a reduced number of coding modes if a difference between the MV of the co-located MB and the average MB is greater than or equal to a threshold; perform RDO for the current MB using all supported coding modes if the difference between the MV of the co-located MB and the average MB is less than the threshold; and determine a coding mode for the current MB based on the RDO results.

A non-transitory computer-readable storage medium storing a set of instructions for execution by a general purpose computer to determine a macroblock (MB) coding mode for a current MB in a dependent view, the set of instructions including a first determining code segment, a selecting code segment, a calculating code segment, a first performing code segment, a second performing code segment, and a second determining code segment. The first determining code segment determines a window around a co-located MB in a base view, wherein the co-located MB is a MB in the base view having a same location as the current MB in the dependent view. The selecting code segment selects a motion vector (MV) of a MB in the window that is close to the co-located MB as a candidate MV. The calculating code segment calculates an average MV of all candidate MVs in the window. The first performing code segment performs rate distortion optimization (RDO) for the current MB using a reduced number of coding modes if a difference between the MV of the co-located MB and the average MB is greater than or equal to a threshold. The second performing code segment performs RDO for the current MB using all supported coding modes if the difference between the MV of the co-located MB and the average MB is less than the threshold. The second determining code segment determines a coding mode for the current MB based on the RDO results.

BRIEF DESCRIPTION OF THE DRAWINGS

A more detailed understanding may be had from the following description, given by way of example in conjunction with the accompanying drawings, wherein:

FIG. 3 is a diagram of an exemplary macroblock layout;

DETAILED DESCRIPTION

An efficient coding mode decision algorithm is described herein, to reduce the overall MVC encoding computational complexity, while retaining a high fidelity to the original exhaustive search mechanism, so as not to sacrifice quality for speed. Two algorithms are described: one based on the coding mode complexity for a current MB, the other based on motion vectors.

Figure 1:
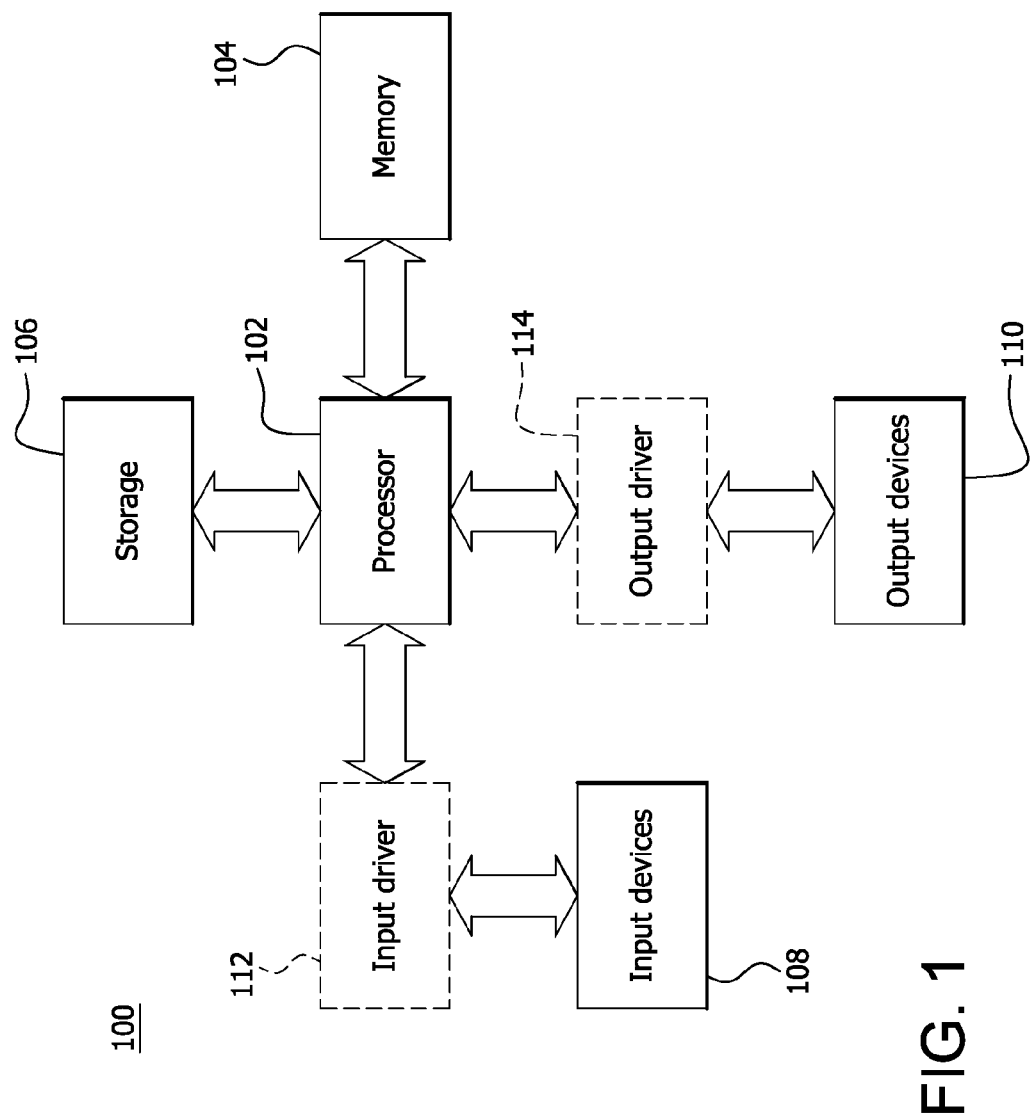
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Several existing approaches may be applied to reduce the overall MVC encoding computational complexity. A first option is to use two motion-compensated prediction passes for the dependent view, one pass predicting from pictures in the base view using inter-view prediction and the other pass performing temporal prediction from pictures in the same dependent view. This option requires added power and processing time, which is not efficient in terms of the bit rate and is not ideal for real-time encoding.

A second option is to blindly limit the prediction modes, such as disabling inter sub-macroblock partition modes (inter8×4, inter4×8, and inter4×4) and/or turning off the small-size intra prediction mode (intra4×4). This option sacrifices the video quality, as there may be some high motion and rich texture areas which need to be encoded using small prediction modes to retain more content detail for visual quality.

A third option is to perform only one way/layer prediction for the entire stream for pictures in the dependent view by either performing temporal prediction from the same dependent view, or by predicting from the base view using inter-view prediction. This option is not an optimal choice, because characteristics of pictures in the base view and the dependent view are highly related and this information may be used to improve the time consuming motion estimation process, thus reducing the overall system computational complexity.

MVC uses the RDO technique to select the optimal coding mode for every MB in each view. A popular RDO formulation uses the Lagrangian multiplier as follows:

$$J(m)=D(m)+\lambda \times R(m)$$ Equation 1 where J(m) represents the RD cost for coding the MB in mode m. D(m) is the distortion between the original MB and the reconstructed MB, R reflects the total number of bits (e.g., the rate) to encode the MB, and $\lambda$ is the Lagrangian multiplier.

To reduce the number of computations and accelerate the complex RDO processing for the dependent view, the prediction mode for each MB in the dependent view may be estimated from the mode selection result of the base view (the previous coded view), as opposed to a blind and independent RDO optimization on each of the views (base and dependent), as is customary in many current implementations. The mode selection result may be stored with the previous coded view. Because there are a limited number of modes, the additional number of bits required to store the mode selection result is minimal.

Statistical results show that most of the areas of motionless video content are predicted in the skip and inter16×16 modes (to save coding bits). The frequency of occurrence of the skip and inter16×16 modes in encoded motionless video sequences, based on statistical averaging, is approximately 80-90%. In contrast to the motionless case, for sequences with a large amount of motion information, the average percentage of selecting the skip and inter16×16 modes as the best mode is over 50%. As a result, if the skip or inter16×16 modes can be determined early without performing the exhaustive RD cost calculation, the processing time may be dramatically reduced.

Figure 2:
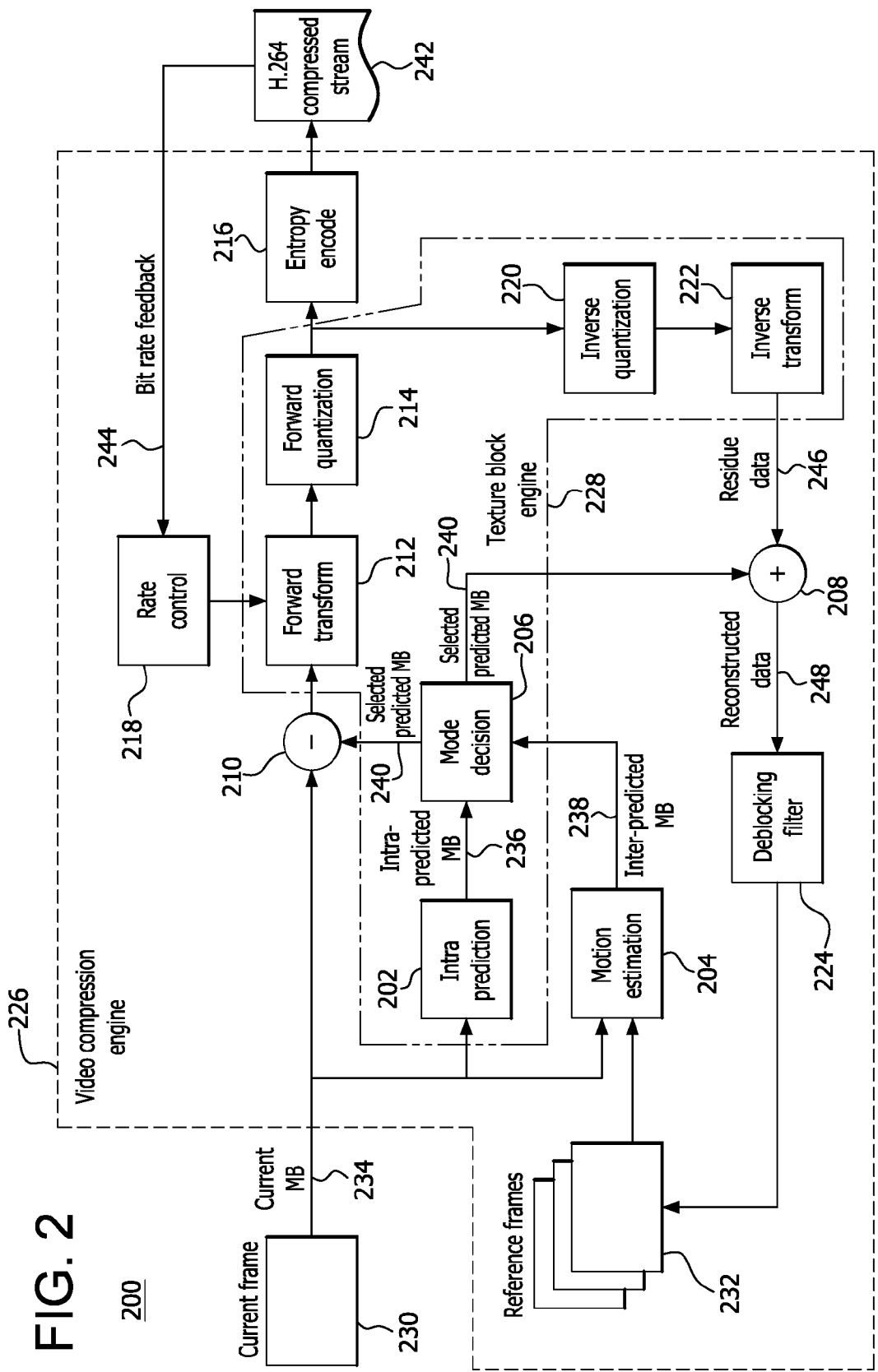
FIG. 2 is a block diagram of an exemplary video encoder.

FIG. 2 is a block diagram of an example video encoder 200. It is noted that the video encoder 200 described herein is an example, and that a person skilled in the art may implement a video encoder with an alternate configuration and/or additional components. The video encoder 200 includes an intra prediction block 202, a motion estimation block 204, a mode decision block 206, an adder 208, a subtracter 210, a forward transform block 212, a forward quantization block 214, an entropy encode block 216, a rate control block 218, an inverse quantization block 220, an inverse transform block 222, and a deblocking filter block 224. In one implementation, the blocks 202-224 may be grouped together as a video compression engine 226. In one implementation, blocks 202, 206, 212, 214, 220, and 222 may be grouped together as a texture block engine 228. It is noted that the video compression engine 226 and the texture block engine 228 may exist in the same implementation.

The video encoder 200 takes a current frame 230 as input; the video encoder 200 processes the current frame 230 at the MB level. A current MB 234 from the current frame 230 is processed in the motion estimation block 204 to form an inter-predicted MB 238 from one of the reference frames 232. The current MB 234 is provided to the intra prediction block 202 to generate an intra-predicted MB 236. The mode decision block 206 evaluates the intra-predicted MB 236 and the inter-predicted MB 238 to determine which MB is better suited for use in encoding the current MB 234. The mode decision block 206 outputs a selected predicted MB 240, which is provided to the adder 208 and the subtracter 210.

The output of the subtracter 210 is provided to the forward transform block 212 to transform the MB, which is then quantized by the forward quantization block 214. The quantized MB is then encoded by the entropy encode block 216 to produce an H.264 compressed stream 242. Bit rate feedback 244 from the compressed stream 242 is provided to the rate control block 218, which may be used to control the forward transform block 212.

In the meantime, following the forward quantization block 214, the inverse quantization block 220 and the inverse transform block 222 generate predicted residue data 246. The residue data 246 is sent to the adder 208 with the selected predicted MB 240 to form reconstructed data 248. The reconstructed data 248 is then filtered by the deblocking filter block 224 to form the reference frames 232.

An early exit condition is proposed for the video compression engine 226, and more specifically inside the texture block engine 228 to bypass a lengthy mode calculation process, without sacrificing quality. Two methods are described to implement the early exit condition: one based on the coding mode complexity for a current MB, and the other based on motion vectors. These methods may be implemented in the mode decision block 206.

Based on the fact that large MB coding mode sizes such as the skip and inter16×16 modes are always chosen for MBs in homogeneous video content, while other smaller MB coding mode sizes are chosen for MBs in video content with active motion or rich texture, the motion and texture characteristics for the dependent view may be learned from the mode decision results of the base view. The motion and texture information may then be used to assist with the mode decision process for the dependent view.

The mode complexity of each MB in the current frame of the dependent view may be estimated using the MB coding mode information of the co-located MB and its surrounding MBs in the same frame from the base view. Table 1 may be used to measure the mode complexity of different MB modes by assigning a weighting factor. The mechanism is general, but for illustration, a simple linear weighing model may be used to provide an approximation of the expected ratio.

TABLE 1

Mode Complexity of different MB modes

| Mode | Complexity |
|---|---|
| skip | 1 |
| inter16 × 16 | 2 |
| inter16 × 8 or inter8 × 16 | 3 |
| inter8 × 8 | 4 |
| inter8 × 4 or inter4 × 8 | 5 |
| inter4 × 4 | 6 |
| intra16 × 16 or intra8 × 8 | 6 |
| intra4 × 4 | 7 |

Figure 3:
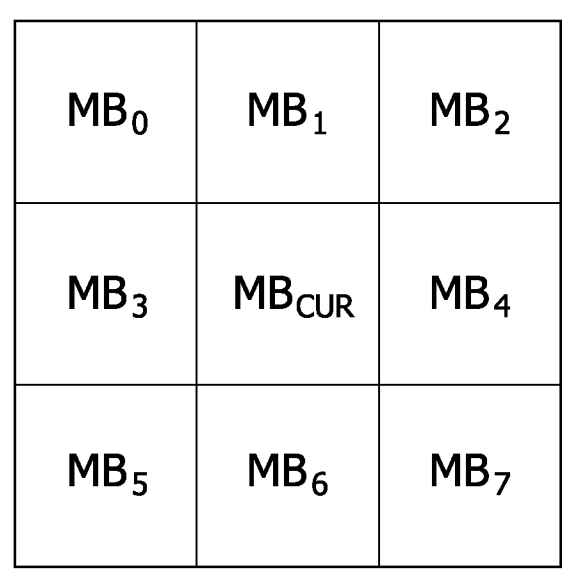

FIG. 3 is a diagram of an exemplary macroblock layout, and is used to describe how to determine the mode complexity of the current MB, shown as $MB_{cur}$. $MB_{cur}$ is the co-located MB from the base view and $MB_0$ to $MB_7$ are its surrounding neighboring MBs in the same frame (i.e., a neighboring MB window). $MC_{MB\_i}$ is a mode complexity of $MB_i$, and $w_i$ is a weighting factor which may be decided based on the proximity of $MB_i$ to $MB_{cur}$ using a distance measure. For a certain area, the mode complexity of the co-located MB is calculated as a cumulative sum of the weighted mode complexities of all of the MBs in the neighboring MB window and is determined by the equation:

$$MC_{total} = \sum_{i=0}^{N}(MC_{MB\_i} \times w_i) \qquad \text{Equation 2}$$

where N is 7 plus the current MB ($MB_{cur}$) in FIG. 3. The cumulative complexity may also be generalized to include a wider neighboring MB window. The most common window size is as shown in FIG. 3, surrounding $MB_{cur}$ by one MB on all sides. Enlarging the window size to more MBs surrounding $MB_{cur}$ obtains additional information for the surrounding MBs, but the additional information may not be useful in evaluating $MB_{cur}$ and may increase the computational overhead.

In a situation involving a MB on the edge of the frame (e.g., if $MB_4$ in FIG. 3 is currently being evaluated), the available neighboring MBs are included in the window. As shown in FIG. 3, the window would include $MB_1$, $MB_2$, $MB_{cur}$, $MB_6$, and $MB_7$. In this case, it may be beneficial to adjust the window size to include more neighboring MBs (e.g., $MB_0$, $MB_3$, and $MB_5$).

The overall complexity ($MC_{total}$) is compared to a threshold, defined herein as TH. The threshold TH is configurable and may be initialized, for example, to a number based on statistical averaging for each category of pictures (e.g., natural/synthetic/header and shoulder, etc.). An initial value of TH=20 may provide an initial estimate of the complexity metric defined in Table 1, for areas using eight neighboring MBs. Other initial values for TH may depend on the complexity measure, which may similarly be changed, using characteristics such as the variance of the texture in the MB.

If $MC_{total}$ is less than TH, then the mode complexity is regarded as low for the current area in the dependent view, which indicates that this is a homogeneous video content area. In this case, the RD calculation (for example, using the Lagrangian formulation in Equation 1, or similarly with any other cost function) is performed to only assess the skip and inter16×16 modes (this is the "early exit condition"), rather than evaluating the full set of modes to select the best MB coding mode for the current MB in the dependent view. The threshold may be updated by multiplying TH by a factor which, for example, is a ratio of the number of bits spent on encoding $MB_{cur}$ with the early exit condition to the average of the number of bits spent on encoding the neighboring MBs.

Figure 4:
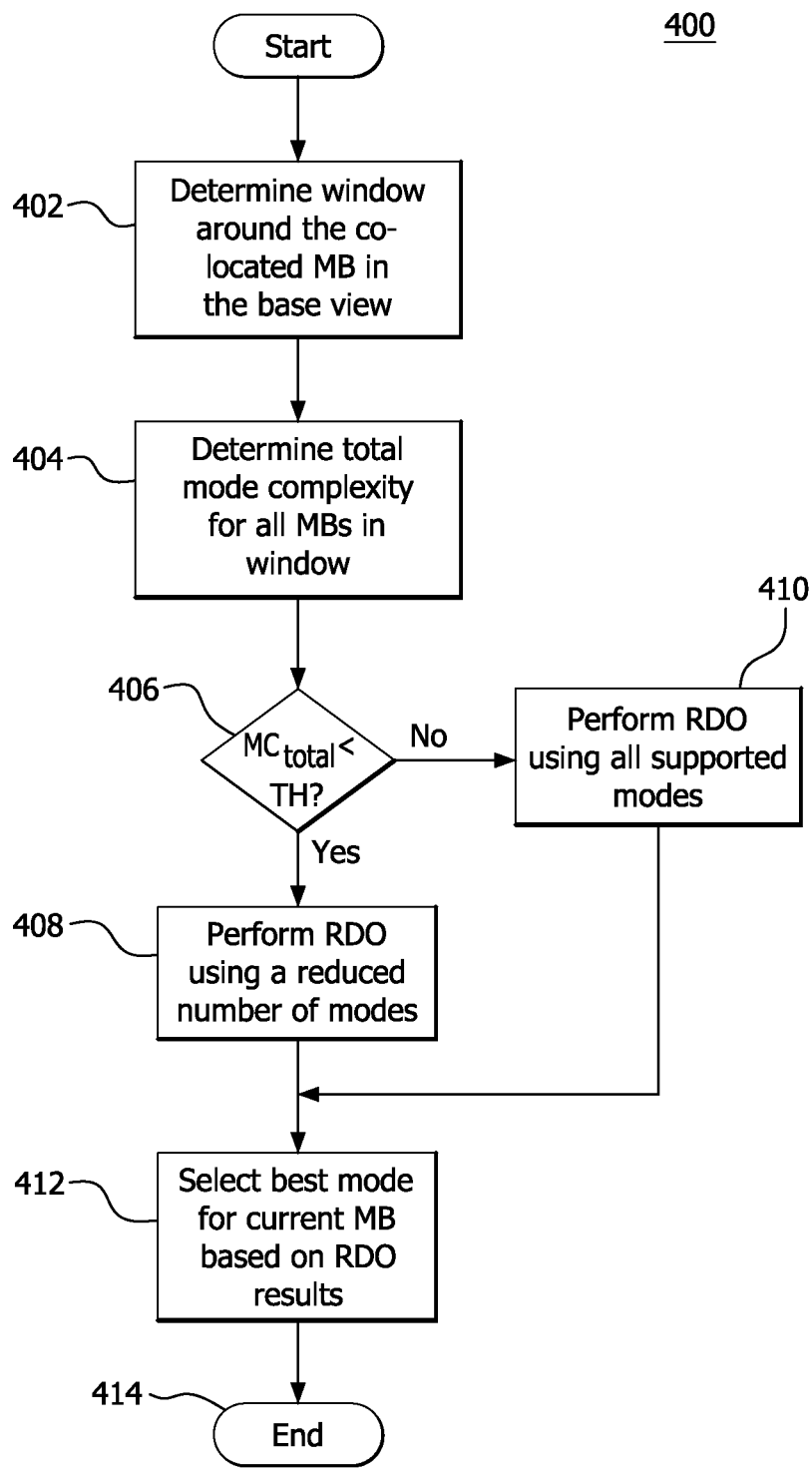
FIG. 4 is a flowchart of a method for determining the best MB coding mode for a current MB based on mode complexity.

FIG. 4 is a flowchart of a method 400 for determining the best MB coding mode for a current MB based on mode complexity. A window of neighboring MBs around the co-located MB in the base view is determined (step 402). The total mode complexity for all MBs in the window is determined (step 404) and is compared to a threshold (step 406). If the total mode complexity is less than the threshold, then the RDO calculations are performed using a reduced number of coding modes (step 408). As noted above, in one implementation, the reduced number of coding modes may include only the skip and inter16×16 modes.

If the total mode complexity is not less than the threshold (step 406), then the RDO calculations are performed using all of the supported coding modes (step 410). After the RDO calculations are performed by either option, the best coding mode for the current MB is selected (step 412) and the method terminates (step 414).

In another method, it is expected that if there are enough boundary regions in a MB, then the MB would have a rich texture. To identify the boundary region of one MB in the dependent view, the motion vectors of the co-located MB and its neighboring MBs may be analyzed in the base view.

FIG. 3 may also be used to explain this method. Define $MV_i$ (i=0 . . . 7) as the motion vector of $MB_i$ in the base view. If the MB is coded in small partitions, always pick the motion vector of the MB that is closer to the current MB, $MB_{cur}$. For example, if $MB_4$ is coded in the inter16×8 mode, then pick the motion vector of the upper 16×8 block as $MV_4$. Calculate the average motion vector $MV_{avg}$ as follows:

$$MV_{avg} = \frac{\sum_{i=0}^{N}|MV_i|}{N} \qquad \text{Equation 3}$$

where N=7 in FIG. 3, but may be different to reflect a non-rectangular shape, or a wider neighboring MB window with a multi-layered squares/logical rings.

If the distance measure between the absolute motion vector of the co-located MB ($|MV_{cur}|$) and the average motion vector $MV_{avg}$ is larger than the threshold $TH_{MV}$, $$||MV_{cur}|-MV_{avg}| \geq TH_{MV} \qquad \text{Equation 4}$$

it is regarded as part of the boundary area (e.g., a big motion case). For the co-located MB in the dependent view, the RD among all of the supported modes needs to be assessed, as the base view statistics suggest that there is a large motion vector. Otherwise, the statistics suggest that this is not a big motion case and the RDO assessment may be limited to the inter16×16 and skip modes. The threshold $TH_{MV}$ may be initialized based on a statistical assessment or a training method through a number of video sequences with different motion/texture information.

The averaging mechanism of the motion vectors is a representative illustration to select a threshold, but the mechanism may be more generic to include various heuristics, such as the median calculation of the motion vectors, the number of MBs with a motion vector, the signs of motion vectors for adjacent MBs, etc.

Figure 5:
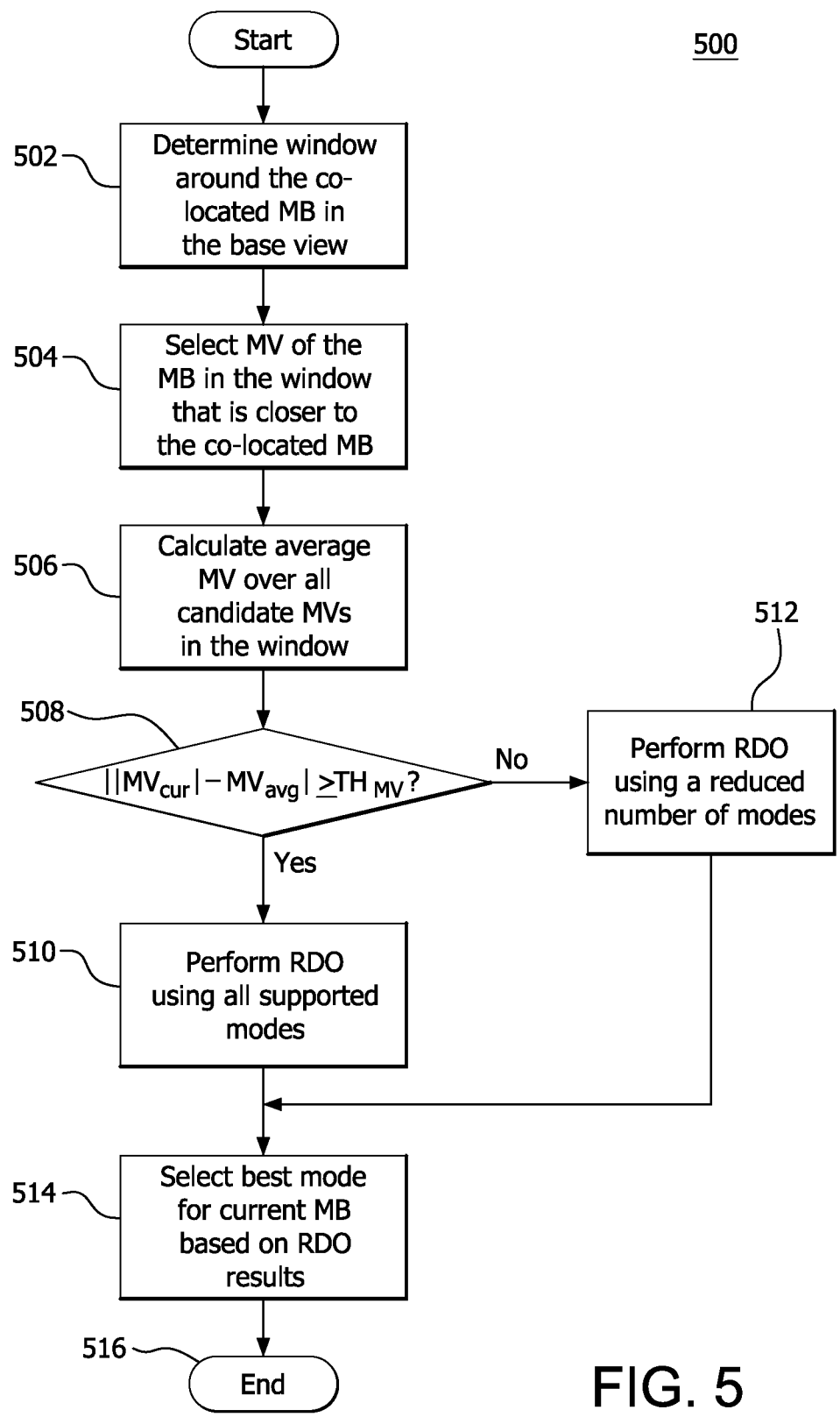
FIG. 5 is a flowchart of a method for determining the best MB coding mode for a current MB based on motion vectors.

FIG. 5 is a flowchart of a method 500 for determining the best MB coding mode for a current MB based on motion vectors. A window of neighboring MBs around the co-located MB in the base view is determined (step 502). The MV of the MB in the neighboring MB window that is closer to the co-located MB is selected as a candidate MV (step 504). The average MV over all candidate MVs in the window is calculated (step 506). The difference between the MV of the co-located MB and the average MV is determined and compared to a threshold (step 508). If the difference is greater than the threshold, then the RDO calculations are performed using all of the supported coding modes (step 510).

If the difference is not greater than the threshold (step 508), then the RDO calculations are performed using a reduced number of coding modes (step 512). As noted above, in one implementation, the reduced number of coding modes may include only the skip and inter16×16 modes.

After the RDO calculations are performed by either option, the best coding mode for the current MB is selected (step 514) and the method terminates (step 516).

Besides motion vectors, other information is also applicable to detect the edge, such as comparing the number of bits spent for encoding the co-located MB and the average number of bits spent for encoding the surrounding MBs or checking the DCT coefficients (especially the high frequency coefficients) of the co-located MB and its neighboring MBs. The quantization parameter level is also a good hint, because edge information is implicit by low quantization parameters. There are other edge detection algorithms, such as the Sobel method, the Laplace method, etc. that may be applied Taking into account the available hardware computation capability and complexity, averaging the surrounding motion vectors of the co-located MB in the base view is a good candidate to be used for boundary detection.

In implementation, the mode complexity method, the motion vector method, or both methods may be used to decide whether the current MB to be encoded in the dependent view belongs to an active motion or rich texture area. Alternatively, only the surrounding four MBs (e.g., up, down, left, and right) of the co-located MB in the base view may be taken into consideration for mode complexity calculation and boundary detection.

For two views (i.e., stereoscopic encoding), these methods propose an efficient coding mode decision algorithm. Compared to the popular MVC encoder implementation, which performs motion-compensated prediction on all of the supported coding modes to select the best prediction mode for both the base view and the dependent view pictures, these methods effectively make use of the coding modes and motion vector information of pictures in the base view to simplify the time consuming RDO assessment for pictures in the dependent view.

Such a speedup would benefit, for example, systems with limited processing power, or could help in handling multiple encoding jobs while performing MVC encoding, such as performing multiple stream encoding jobs. In some systems, there may be a large throughput gain compared to the popular MVC encoder implementation, as it is known that the exhaustive RDO process occupies a large amount of the encoding time. Selecting the best coding mode for each MB occupies approximately 60% of the total video encoding time. In true multiview encoding (i.e., more than two views), the benefits of the throughput gain associated with these methods may be more noticeable, because the gain is propagated with every new layer.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for determining a macroblock (MB) coding mode for a current MB in a dependent view, comprising:
   determining a window around a co-located MB and neighboring MBs in a base view, wherein the co-located MB is a MB in the base view having a same location as the current MB in the dependent view;
   selecting, for at least each neighboring MB sharing a portion of a border with the co-located MB in the window, a motion vector (MV) as a candidate MV;
   calculating an average MV from each of the candidate MVs in the window;
   performing rate distortion optimization (RDO) for the current MB using a first number of coding modes when a difference between the MV of the co-located MB and the average MV is less than or equal to a threshold;
   performing RDO for the current MB using a second number of coding modes greater than the first number of coding modes when the difference between the MV of the co-located MB and the average MV is greater than or equal to the threshold; and
   determining a coding mode for the current MB based on the RDO results.

2. The method according to claim 1, wherein the window around the co-located MB is one MB in all directions such that the window surrounds the co-located MB.

3. The method according to claim 1, wherein the threshold is determined based on characteristics of the current MB.

4. An apparatus configured to determine a macroblock (MB) coding mode for a current MB in a dependent view, comprising:
   one or more processors, configured to: determine a window around a co-located MB and neighboring MBs in a base view, wherein the co-located MB is a MB in the base view having a same location as the current MB in the dependent view;
   select, for at least each neighboring MB sharing a portion of a border with the co-located MB in the window, a motion vector (MV) as a candidate MV;
   calculate an average MV from each of the candidate MVs in the window;
   perform rate distortion optimization (RDO) for the current MB using a first number of coding modes when a difference between the MV of the co-located MB and the average MV is less than or equal to a threshold;
   perform RDO for the current MB using a second number of coding modes greater than the first number of coding modes when the difference between the MV of the co-located MB and the average MV is greater than or equal to the threshold; and determine a coding mode for the current MB based on the RDO results.

5. The apparatus according to claim 4, wherein the mode decision block is further configured to:
determine the window around the co-located MB as one MB in all directions such that the window surrounds the co-located MB.

6. The apparatus according to claim 4, wherein the mode decision block is further configured to:
determine the threshold based on characteristics of the current MB.

7. A non-transitory computer-readable storage medium storing a set of instructions for execution by a general purpose computer to determine a macroblock (MB) coding mode for a current MB in a dependent view, the set of instructions comprising:
a first determining code segment for determining a window around a co-located MB and neighboring MBs in a base view, wherein the co-located MB is a MB in the base view having a same location as the current MB in the dependent view;
a selecting code segment for selecting, for at least each neighboring MB sharing a common border with the co-located MB in the window, a motion vector (MV) as a candidate MV;
a calculating code segment for calculating an average MV from each of the candidate MVs in the window;
a first performing code segment for performing rate distortion optimization (RDO) for the current MB using a first number of coding modes when a difference between the MV of the co-located MB and the average MV is less than or equal to a threshold;
a second performing code segment for performing RDO for the current MB using a second number of coding modes greater than the first number of coding modes when the difference between the MV of the co-located MB and the average MV is greater than or equal to the threshold; and
a second determining code segment for determining a coding mode for the current MB based on the RDO results.

8. The non-transitory computer-readable storage medium of claim 7, wherein the instructions are hardware description language (HDL) instructions used for the manufacture of a device.

* * * * *